United States Patent [19]

Ehrhardt

[11] Patent Number: 5,300,736
[45] Date of Patent: Apr. 5, 1994

[54] ADAPTIVE TIMING IN-MOTION CHECKWEIGHER

[75] Inventor: Steven P. Ehrhardt, Ithaca, N.Y.

[73] Assignee: Hi-Speed Checkweigher Co., Inc., Ithaca, N.Y.

[21] Appl. No.: 849,743

[22] Filed: Mar. 12, 1992

[51] Int. Cl.⁵ .................................. G01G 19/00
[52] U.S. Cl. .................................. 177/145; 177/1; 177/12; 177/25.13; 177/50; 177/119; 364/567
[58] Field of Search ............... 177/119, 12, 145, 50, 177/1, 25.13; 364/567

[56] References Cited

U.S. PATENT DOCUMENTS

| | | | |
|---|---|---|---|
| 3,857,488 | 12/1974 | Le Cren | 209/73 |
| 4,231,439 | 11/1980 | Hall, Jr. et al. | 177/25.13 |
| 4,413,739 | 11/1983 | Kohashi | 209/593 |
| 4,535,854 | 8/1985 | Gard et al. | 177/1 |
| 4,709,770 | 12/1987 | Kohashi et al. | 177/50 |
| 4,825,965 | 5/1989 | Inoue et al. | 177/25.14 |
| 4,951,763 | 8/1990 | Zimmerman et al. | 177/164 |
| 5,119,894 | 6/1992 | Crawford et al. | 177/145 |

*Primary Examiner*—Benjamin R. Fuller
*Assistant Examiner*—Randy W. Gibson
*Attorney, Agent, or Firm*—Bean, Kauffman & Spencer

[57] ABSTRACT

A method and apparatus for an in-motion weighing system which includes a package conveyor, a weigh pan, a package detector positioned adjacent to the conveyor and upstream from the weigh pan, a timer for determining the time required for a package to pass by the package detector, means for storing the time required for a point on the conveyor to transition the weigh pan, means for subtracting the package passing time from the weigh pan transition time for establishing a read scale window, and a means for measuring the average weight of a package on the weigh pan during the read scale window.

20 Claims, 13 Drawing Sheets

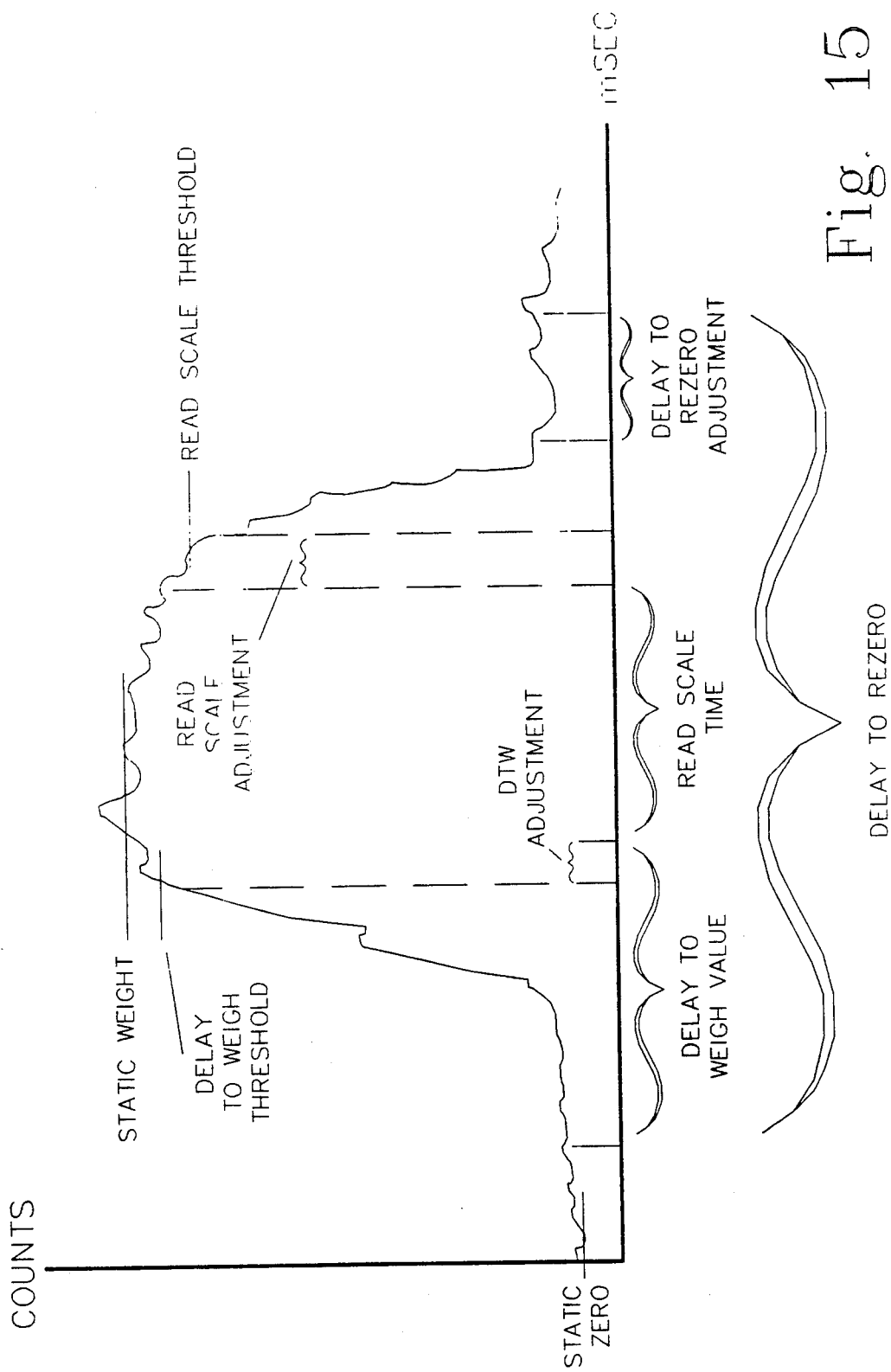

ADAPTIVE TIMING IN-MOTION CHECKWEIGHER

FIELD OF THE INVENTION

The present invention is related to in-motion weighing, commonly referred to as checkweighing, and a method for automatically establishing weighing parameters which includes an adaptive timing algorithm for establishing read scale time as a function of package length.

BACKGROUND OF THE INVENTION

Present day society relies on extensive use of automation for packaging products for sale. This usually entails a means for determining the quantity of material placed within a retail package. Weighing is the most practical and acceptable form for controlling the material placed in a package and this is accomplished largely by scales known as in-motion weighing devices or checkweighers. Because of the speeds involved, this requires very precise real time measurement of containers prior to entering the weighing/filling station and during the filling operation so that filling may be terminated at a precise point. Setting up such a system is critical, the slightest miscalculation will result in enormous losses by over filling packages or excessive customer complaints and lawsuits due to under-filled packages.

In the past, the very critical operation of setting up an in-motion weigher was usually accomplished manually with the aid of an assortment of calculating devices and test equipment. The steps included a first operation where the load of the platform sitting on top of the transducer device was calculated. This is commonly referred to as the dead load.

Once the dead load was established, a ranging function was set. This was accomplished via a potentiometer using the highest weight package to set up the system. Alternately, the gain or range potentiometer was adjusted each time a different weight range was used.

Typical transducers used in such systems are a strain gauge load cell or a flexure type scale system using either a LVDT (Linear Variable Differential Transformer), a DCDT (Direct Current Differential Transducer), or force restoration (a magnetic means of counteracting forces in the scale by pumping current in the opposite direction to bring the scale back to an equilibrium point which must be offset).

Because the systems are electronic, they have some inherent noise imposed on control signals; typically, in-motion or checkweighing scales have noise in the range of 20 Hz or lower. This and higher values of noise have been filtered out by a low pass filter. However, the method by which this was done in the past used typical active analog filters and required quite a bit of human intervention to monitor the actual scale output and determine the appropriate resistor network or resistor values to tune the filter to provide a reasonable weight signal and eliminate higher frequency noises.

A recorder or oscilloscope was required to determine the point at which sampling of the net weight signal was taken. The window over which the weight signal was read was a potentiometer type adjustment requiring human intervention. Furthermore, the filter value was dependent on the package speed and weight and, therefore, any time a speed or weight change was required, manual intervention and resetup were required. Analog filter values also limited the rate at which packages could be weighed due to charge and discharge time of the filters being used.

The development of microprocessor controlled checkweighing has eliminated many of the difficulties inherent in the prior art systems discussed above but checkweighers are still designed to weigh every package for a fixed amount of time called the "read scale time". As the item to be weighed moves across the weigh pan, the weight curve rises, bounces, stabilizes for a period of time, and then falls as the package exits the weigh pan. During a portion of the period of time for which the package has settled, the checkweigher samples the weight curve and determines the weight of the package.

The period of time during which the package is stable and therefore "weighable" depends upon the length of the package, the speed of the conveyor belt, and the length of the weigh pan. Normally the speed of the belt is fixed and the length of the weighpan is always fixed. Therefore the length of the period of weighability is chiefly a function of package length. The shorter the package, the longer the period of "weighability". The longer the period of weighability, the longer the read scale time can be. Within the range of read scale times typically available to in-motion checkweighers, it has been established that the longer the read scale time, the better the accuracy. This is because a longer read scale time enables the system to filter out more of the low frequency noise which compromises checkweigher accuracy. Thus it is desirable to have as long a read scale time as possible.

Checkweighers use one of two strategies to overcome problems created by fixed read scale times. In one approach, the read scale time is fixed for all packages to the value permitted by the longest package to be weighed, i.e. a short read scale time. In such systems, the shorter package will not be weighed as accurately as they can be, or in some situations- as accurately as they need to be.

In the second approach, the different size packages are presented to the checkweigher in a slow and predictable manner, so that it can choose from a variety of different read scale times stored in its memory. This is too expensive. Packages have to be separated and sorted by length plus it is too expensive to slow down production for benefit of the checkweighing operation. Furthermore, it is complicated to arrive at a set of different read scale times from a series of different calibrations.

The potential errors and operator skill requirements of prior art systems are obvious and this has led to constantly increasing packaging costs and thus increase consumer costs.

OBJECTIVES OF THE INVENTION

In view of the problems inherent in the prior art in-motion weighing systems, it is a primary objective of the present invention to provide an automated in-motion checkweighing system which accomplishes all major control functions via a microprocessor manipulated algorithm which dynamically responds to the randomly varying lengths of rapidly moving packages and optimizes its read scale time to exploit the maximum available period of "weighability" for each and every package.

Another objective of the present invention is to provide a continuous or in-motion weighing system incorporating methods of control/machine setup that reduce the number of operator inputs which guide the setup and use more intuitively understandable operator inputs.

A still further objective of the present invention is to improve the accuracy of state-of-the-art in-motion weighing devices.

Another objective of the present invention is to provide an automatic setup for weighing machines where the weighing process is optimized by unique algorithms.

Another objective of the invention is to provide a weighing device wherein weight sampling is optimized automatically; i.e., the window over which weights are taken are automatically determined.

Another objective of the invention is to eliminate spurious readings by using algorithms which control sampling times, the time between samples, and sampling rates and impose digital limits on data taken.

Another objective of the invention is to provide a system where the sampling rate for reading weights is increased or decreased to fit the available weight information window based on a determination of package length, therefore allowing lower filter values if higher time exists and achieving better accuracy.

These and other objects, features and advantages of the present invention will become more clearly apparent from the following detailed description of various embodiments of the invention, which refers to the appended drawings and is given by way of illustration, but not by limitation.

SUMMARY OF THE INVENTION

The in-motion weighing system presented in this patent is designed to allow an untrained operator to set up and weigh a package or a plurality of packages advancing down a packaging conveyor. The system incorporates circuitry including a microprocessor controlled programmable gain amplifier in a fashion which eliminates potentiometers, jumpers, resisters, and other components needed by the prior art systems to manually adapt or change the weighing functions of the automated packaging systems. The microprocessor accomplishes these goals through the manipulations of algorithms which cause the automatic setting of system parameters based on system constants and desired operations. The algorithms include setting up or establishing scale offsets, gain, weight timers based on package length and responsive digital filters for eliminating system noises.

DETAILED DESCRIPTION OF THE PREFERRED EMBODIMENTS

Figure 1:
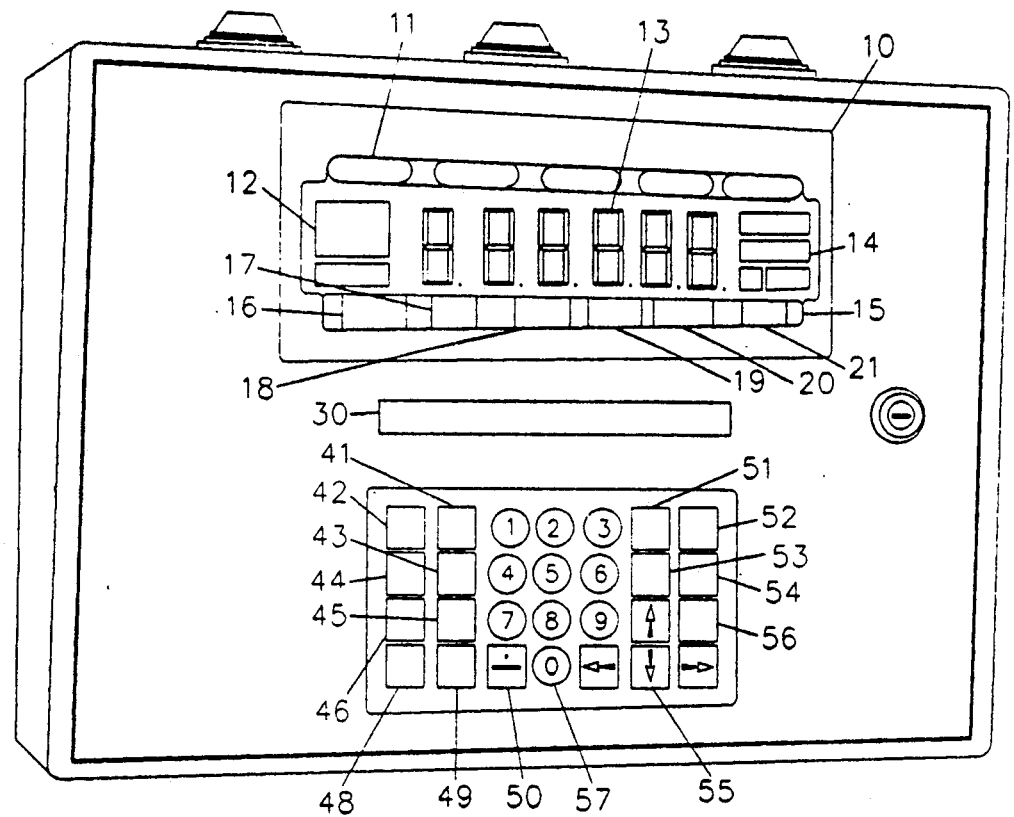
FIG. 1 is a front view of the in-motion weigher control panel.
Figure 19:
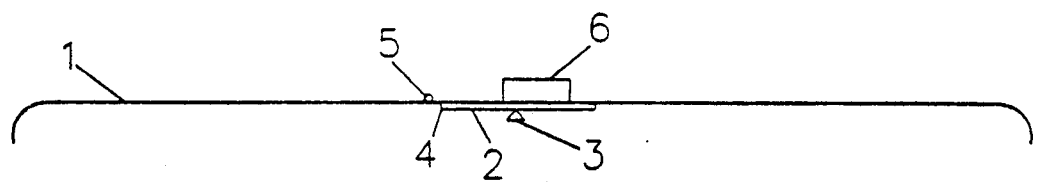
FIG. 19 illustrates the basic elements of an in-motion weigher.

FIG. 1 illustrates the display and control panel of an in-motion weigher or checkweigher designed according to the present invention. It includes a multifunction display 10 comprised of the following indicators.

A Zone Indicator Display, 11, including Zone 1 (Red)—gross underweights; Zone 2 (Yellow)—just under; Zone 3 White)—accept; Zone 4 (Blue)—just over; and zone 5 (Green)—gross overweight.

A Weight Mode Indicator "DEVIATION FROM TARGET/ACTUAL", 12, which indicates the deviation from target or actual weight readout modes.

An LCID Weight Display, 13, which displays the actual net weight of the product or variation as a plus or minus from targets.

A Weight Unit Indicator, 14, which displays weight units in grams, kilograms, ounces, or pounds. (Operator selected).

System Status Indicators, 15, provide:

"SAMPLE PACKAGE" (orange indicator 16) which indicates that the system has automatically ejected package(s) from the line and displays the weight for operator verification. This allows a product weight check on accuracy without stopping or interfering with line operation.

A "NO TOTAL" (Orange indicator 17) which indicates that the counters are "off" during set-up and calibration.

A "GOOD REZERO"(Green indicator 18) which indicates that the scale is automatically rezeroed every time there is a gap of one or more packages in the production flow.

A "NEEDS REZERO" (Red indicator 19) immediately alerts the operator to excessive product build up on the scale or that automatic rezero is overdue.

A "PACKAGE SPACING" (Red indicator 20) alerts the operator that packages are too close together for accurate weighing.

A "SCALE NOISE" (Red indicator 21) alerts the operator of excessive internal and/or external interference i.e., vibration, air currents, and unstable product transfer.

An alphanumeric display, 30, prompts the operator in all checkweigher functions it uses full English language to verify inputs, calibrations, set-up diagnostics, etc.

A direct key pad access input device, 40, includes 28 discrete, tactile keys. The keys on the left side of this sub-panel are set function keys which provide single stroke, direct access to the most commonly used operator functions. For instance, the "NO TOTAL" key, 41, turns off the product counters so trial and test packages can be run without affecting product count information already stored in memory.

The "SAMPLE PACKAGE" key, 42, automatically ejects package(s) from the line and cause up to the last 10 weights to be displayed for operator verification. Thus the operator can take an actual product weight and check accuracy without stopping or interfering with production.

The "TARGET/TARE" key, 43, enters target weight and associated tare for up to 25 products.

The "ZONES" key, 44, enables the operator to view and/or change current product set point limits.

The "KEY CODE" key, 45, provides three levels of security: KEY LOCK=on - off - run.
KEY CODE=KEY LOCK bypassed by numerical password.
SUPER KEY CODE=allows supervisor to select level of operator access.

The "CLEAR TOTALS" key, 46, zeros the production counters for selected product zones.

The "VIEW TOTALS" key, 48, calls up the counters for package count and percentages by zones for "Accepts", "Overweights", "Underweights" and "Total".

The "PROD" key, 49, instantly recalls all of the product parameters and totals for any of the 25 individual pre-entered products.

The ". - ON/OFF" key, 50, enters the decimal point position for numeric entries and accepts or rejects status by individual zones.

The keys on the right hand side of the sub-panel are a distinguishable color from those keys on the left hand side of the panel and they provide menu selection and control functions.

The "HELP/SETUP" key, 51, provides a step-by-step narrative for control calibration The "NORMAL/DISP" key, 52, returns the system to the original operating mode and displays current set-up limits.

The "MENU" key, 53, provides access to all operator functions, i.e.; choose, view, and change the desired operating mode.

The "CANCEL" key, 54, deletes the last entry.

The "ENTER" key, 56, enters data into memory.

The cursor or arrow keys, 55, allow the operator to scroll through the entire menu.

The ten numeric keys in the center of the sub-panel are used to enter values as required.

Figure 2:
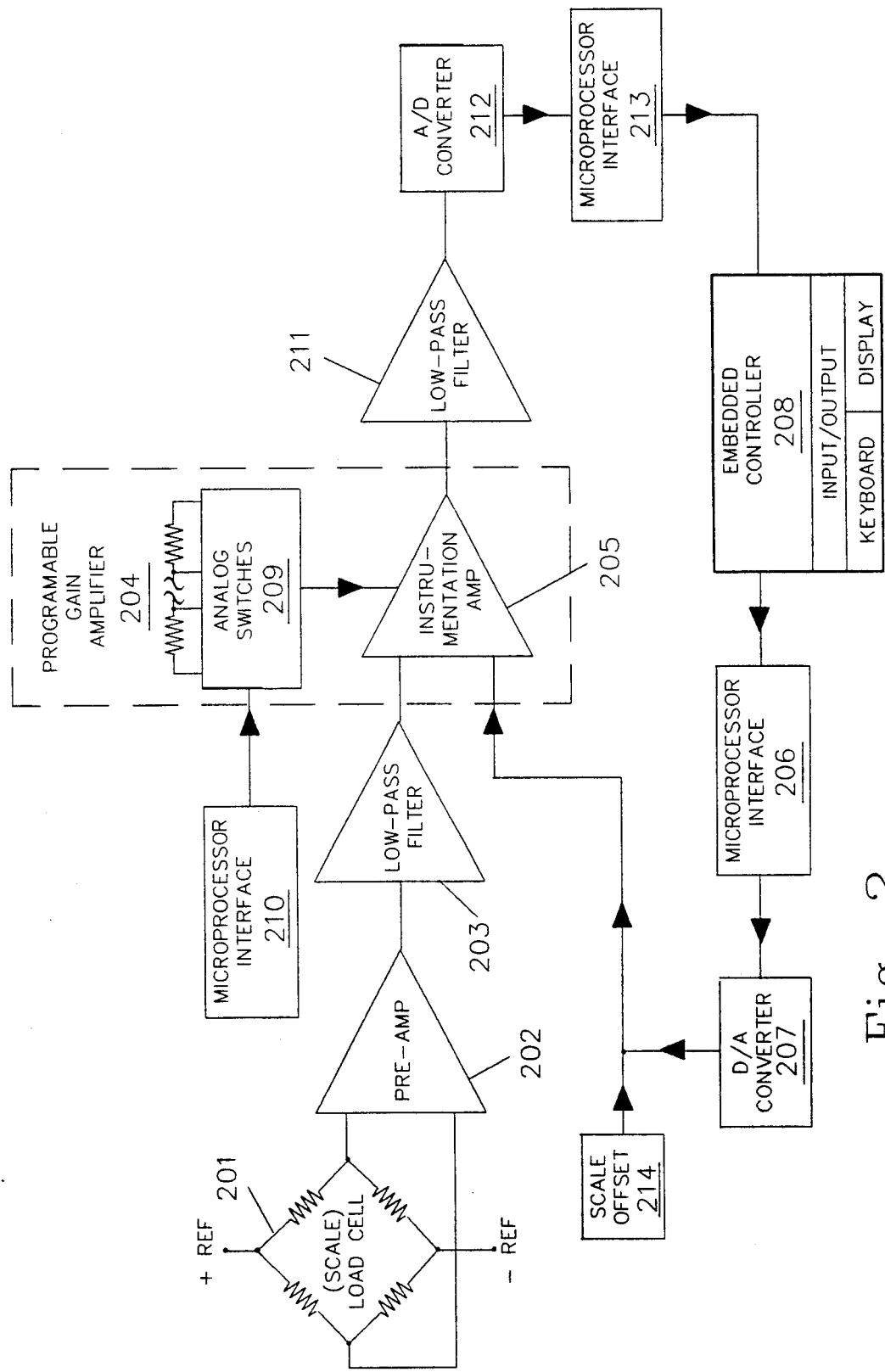
FIG. 2 is a block diagram of the hardware required to implement the invention utilizing an analog load cell.
Figure 3:
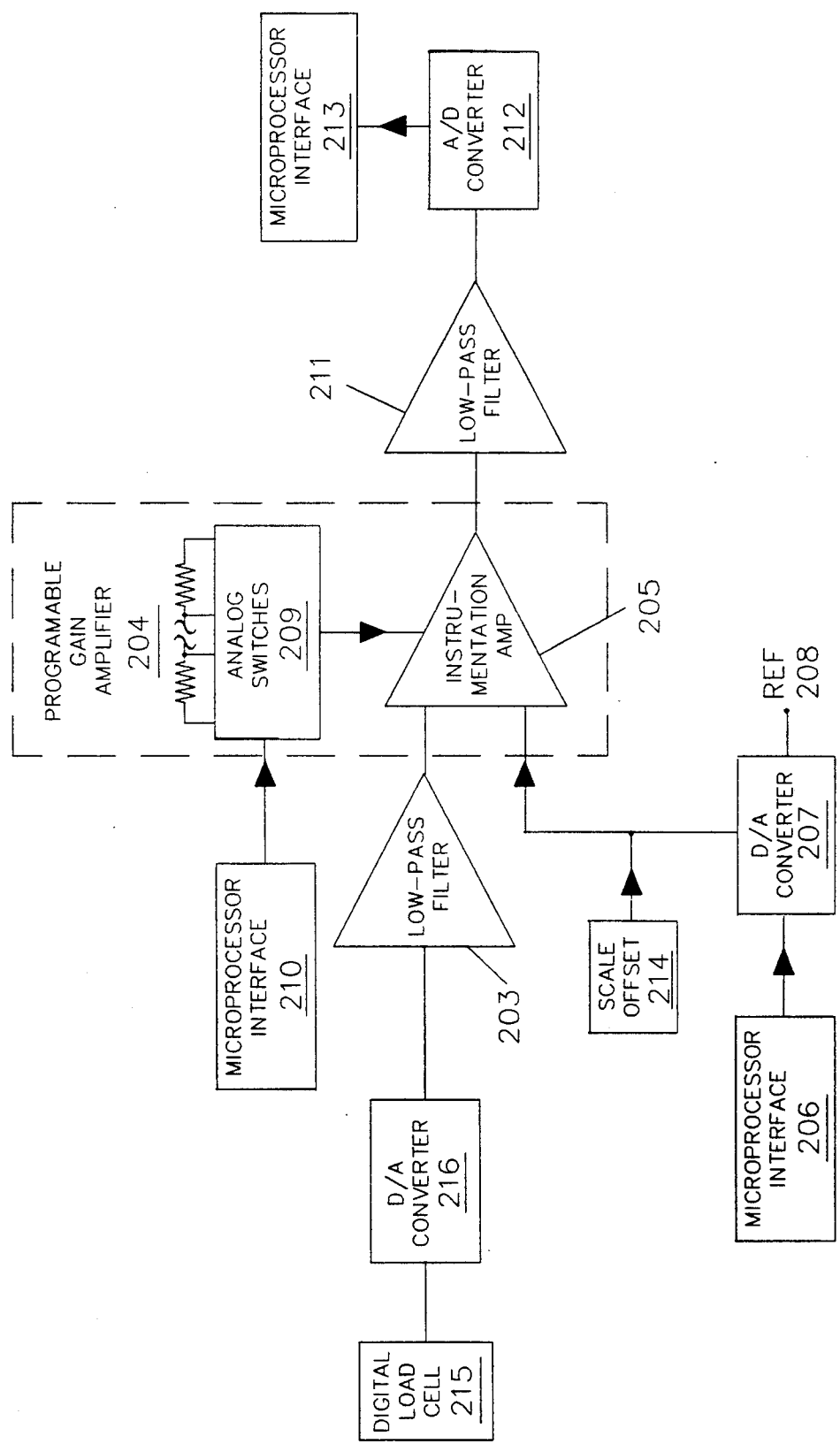
FIG. 3 is a block diagram of the hardware required to implement the system utilizing a digital load cell.

The circuitry controlling and controlled by control panel 10 is illustrated in FIGS. 2 and 3 wherein the embedded controller and control panel are designated 208 and interconnected to the system by microprocessor interfaces 206, 210, and 213. The embedded controller is a standard state of the art integrated circuit system including a microprocessor, static RAM memory with battery back-up, an EPROM program memory, an EEPROM for nonvolatile storage of product related data, timers, an interrupt controller, an input/output interface, a keyboard interface, and a display interface. FIG. 2 illustrates the system adapted to use an analog load cell such as the resistive bridge load cell 201 (the resistive bridge illustrated is for simplification of the presentation only). The analog voltage level produced by the load cell, regardless of type, is applied to preamplifier 202 and then via a low pass filter 203 to a programmable gain amplifier 204. The programmable gain amplifier 204 includes an instrumentation amplifier 205 which receives a scale offset input and the scale weight signal. The programmable gain amplifier also includes an analog switch array 209 which allows the resistive elements controlling gain to be switched by the microprocessor via the microprocessor interface 210 and thus control the amplifier gain.

The scale offset 214 input is adjusted by a microprocessor interface 206 through a digital-to-analog converter 207. This adjustment entails setting the offset level of the instrumentation amplifier 205 of the programmable gain amplifier 204.

The output of the programmable gain amplifier is applied to a low pass filter buffer 211 and then to the microprocessor via an analog-to-digital converter 212 and interface 213. The microprocessor preforms sampling routines on the incoming signal and smooths the data by functioning as a digital filter.

FIG. 3 is an adaptation of FIG. 2 designed for use with a digital load cell 215 such as a quarts crystal transducer, etc.

Figure 4:
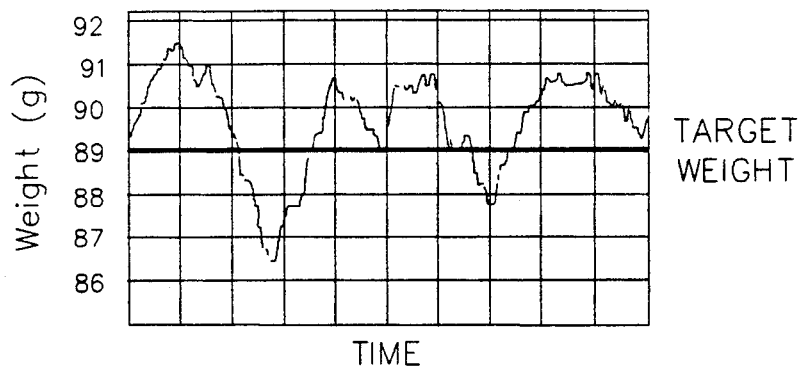
FIG. 4 depicts the weight vs. time curve relative to the target weight in a no-filter system.
Figure 5:
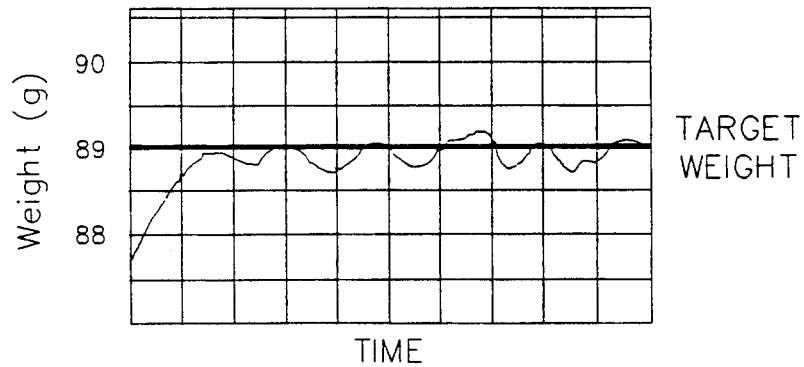
FIG. 5 depicts the weight vs. time curve relative to the target weight in an analog-filter system.
Figure 6:
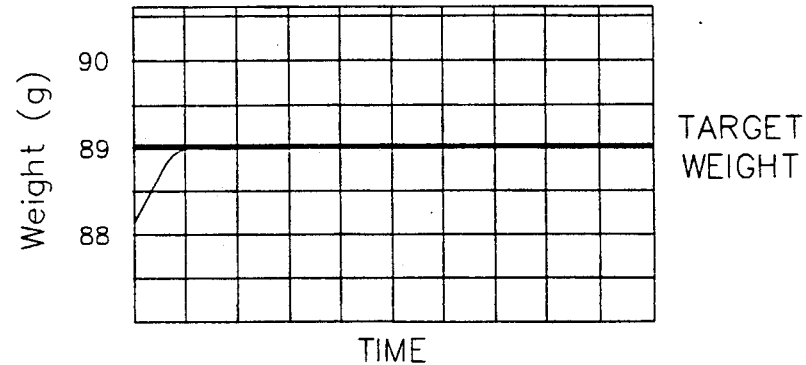
FIG. 6 depicts the weight vs. time curve relative to the target weight in a digital-filter system.

Irrespective of the type of load cell, the system uses digital signal processing which provides better accuracies compared to existing equipment and superior noise free operation. This is exemplified by the summaries of test data presented in FIGS. 4, 5, and 6. FIG. 4 depicts the weight vs. time curve relative to the target weight in a no-filter system. Note that the no-filter system has a 2.5 gram tolerance which in the example equates to an error potential of 2.5%. FIG. 5 depicts the weight vs. time curve relative to the target weight in an analog-filter system. Note that the analog-filter system has a 0.25 gram tolerance which in the example equates to an error potential of 0.25%. FIG. 6 depicts the weight vs. time curve relative to the target weight in a digital-filter system which has a 0.05 gram tolerance that in the example equates to an error potential of only 0.05%.

Digital filtering is a form of signal processing that is done in the digital domain as opposed to the continuous or analog domain. The digital domain is also known as the discrete time domain and is represented by 'z', the discrete time complex variable. The z domain corresponds to the imaginary parts and are frequently shown graphically. The graphical representation is known as the 's' plane in analog and the 'z' plane in digital. System response can be determined from these graphs by plotting the poles and zeros of the system's transfer function.

The transfer function of an analog filter is given as:

$$H(s) = A \frac{a_o + a_1 s + a_2 s^2 + \ldots + a_n s^n}{b_o + b_1 S = b_2 S^2 + \ldots b_n S^n} = \frac{Y(s)}{X(s)} - \frac{\text{output}}{\text{input}}$$

where: s is the complex variable equal to $1+jw$
n is the filter order
a and b are the coefficients that determine the response of the filter (i.e. low pass, high pass, Butterworth, etc.); and A is the amplification constant.

The transfer function is used to determine the values of the components used to make the filter (values of resistors and capacitors).

The transfer function of a digital filter is given as:

$$H(z) = A \frac{a_0 + a_1 Z^{-1} + \ldots + a_k Z^{-k}}{b_0 + b_1 Z^{-1} + \ldots + b_k Z^{-k}} = \frac{Y(z)}{X(z)}$$

where: z is the digital complex variable
$a_n$ are the numerator coefficients (zeros)
$b_n$ are the denominator coefficients (poles) that also determine the filter response The transfer function can be expressed as a difference equation:

$$Y(n) = A(a_0 X(n) a_1 X(n-1) + \ldots + a_k X(n-k) - b_1 Y(n-1) \ldots b_k Y(n-k))$$

where: $Y(n)$ is the present output samples
$Y(n-1)$ the previous out sample, etc.
$X(n)$ the present input sample
$X(n-1)$ the previous input sample etc.

There are two types of digital filters; recursive and non-recursive. Recursive filters are also known as infinite impulse response or IIR filters and can be made to emulate an analog filter. They are known as recursive because they use previous output samples (feedback). The feedback terms are also called the poles of the system and are represented by the denominator terms of the previous equation. Non-recursive filters don't have feedback terms and don't have a "Z" counterpart in the analog world. They are also known as finite impulse response filters or FIR filters. They only have zeros (numerator) terms and are represented by the previous equation without the denominator.

A second order recursive digital filter is given by:

$$H(z) = \frac{a_0 + a_1 Z^{-1} + a_2 Z^{-2}}{1 + b_1 Z^{-1} + b_2 Z^{-2}} = \frac{Y(n)}{X(n)}$$

Figure 7:
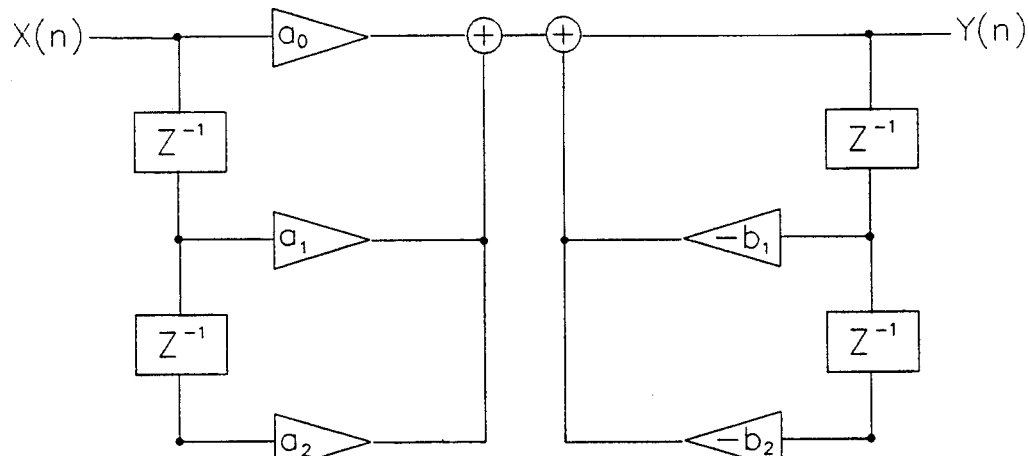
FIG. 7 is a schematic presentation of the Direct form digital filter.

The transfer function can also be converted to a difference equation:

$$Y(n) = A(a_0 X(n) + a_1 X(n-1) + a_2 X(n-s)) - b_1 Y(n-1) - b_2 Y(n-2))$$

where: $Y(n)$ is the present output sample
$Y(n-1)$ is the previous output sample
$Y(n-2)$ is the second previous output sample
$X(n)$ is the present input sample
$X(n-1)$ is the previous input sample
$X(n-2)$ is the second previous input sample This equation is represented in graphical form in FIG. 7. This form is known as the Direct form. It has four delay elements ($Z_{-1}$), 5 multiplies, and 6 adds.

Figure 8:
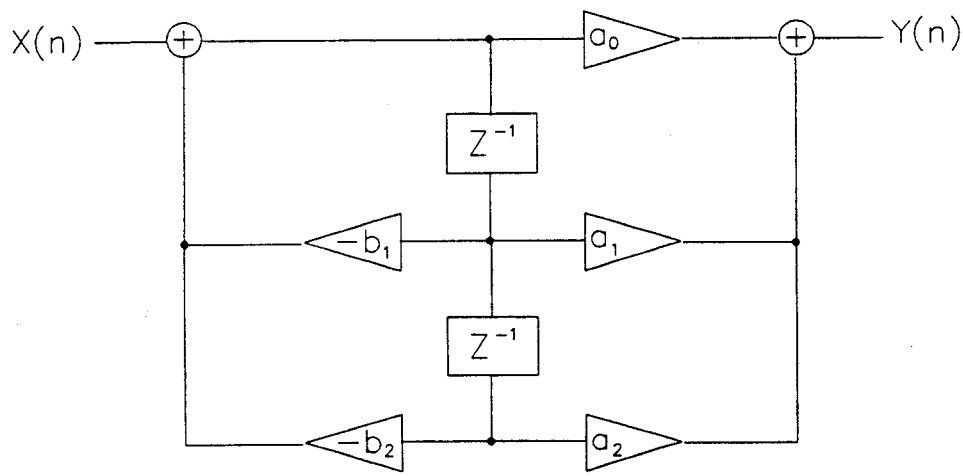
FIG. 8 is a schematic presentation of the Conical form digital filter.

Another very popular form is the Canonical form illustrated in FIG. 8. The Canonical form has the advantage of only two delay elements per second order cell compared to four delay elements per cell for the Direct form. The Direct form, however, can have its delay elements precharged to some output value.

Figure 9:
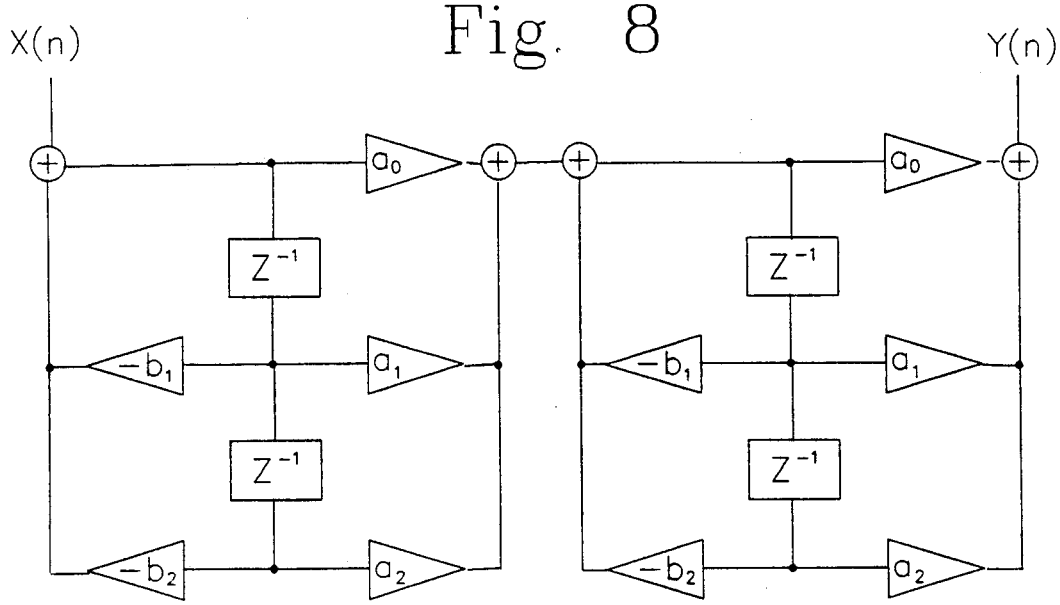
FIG. 9 is a schematic presentation of a high order digital filter.

Filters of higher order can be made by adding additional cells as illustrated in FIG. 9.

The response of the digital filter is determined by the coefficients a and b. There are computer programs available that will compute the coefficients given the sampling rate, type of filter, and order.

Figure 10:
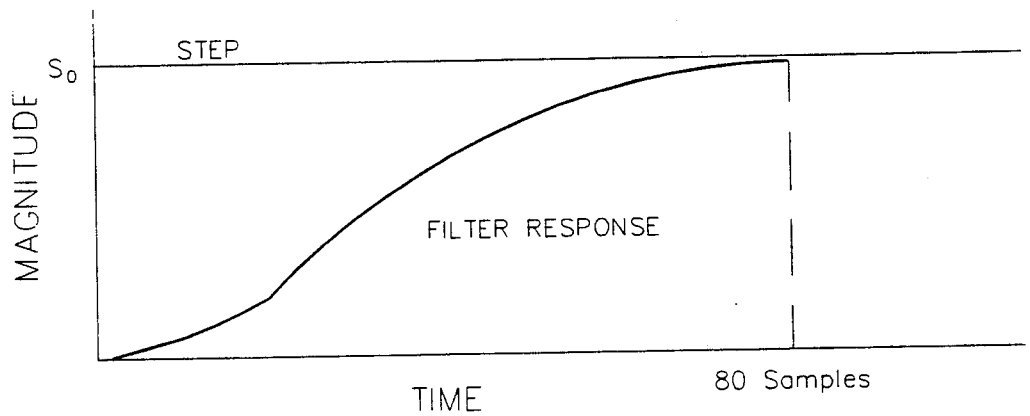
FIG. 10 is a graphic presentation of the response of a Direct form digital filter.

The canonical form digital filter is presently used in the Front-end software. The coefficients were provided by Augusto Mayer of Toledo Research Center (TRC). The response of the filter is Gaussian, 4 pole, low pass where the cutoff is 2% of the sampling rate. The filter needs 80 samples "run through" to come to the full value given a step input as illustrated in FIG. 10.

Figure 11:
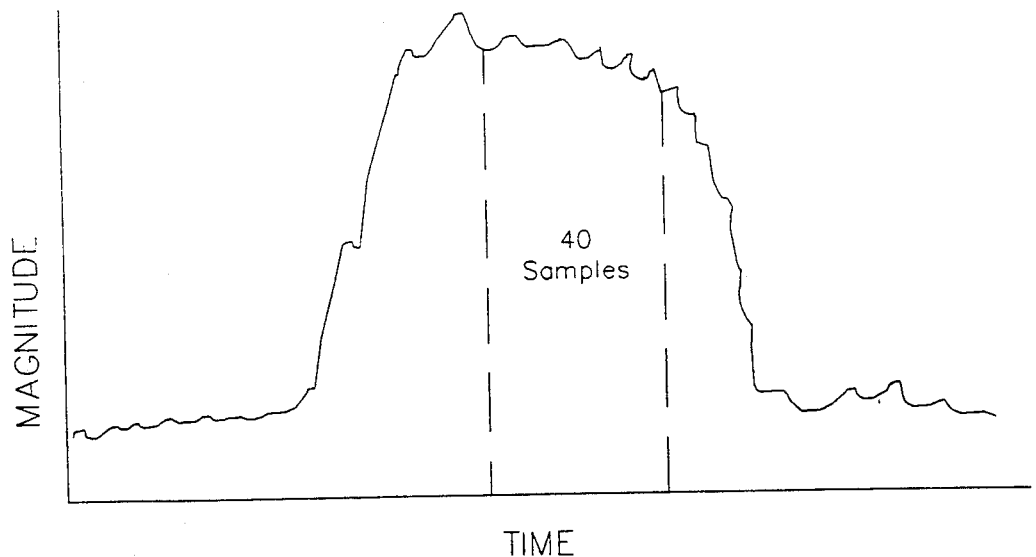
FIG. 11 illustrates the sampling period for a digital filter.

The Front-end digital filter is used in a "gated" mode. The filter is "turned on" only after the delay to weigh timer has timed out. This makes it possible to use a lower cutoff than would be possible in a continuous mode. The filter takes 40 samples during the read scale time and processes those samples during the time between packages, see FIG. 11. The 40 samples are "run through" twice to satisfy the needed 80 samples. The time between samples is the sampling period and is determined by the filter cutoff point; the lower the cutoff the longer the sample period.

The system is designed to allow an untrained operator to set up and weight a package "from scratch". The system's circuitry is microprocessor controlled. This eliminates the potentiometers, jumpers, and resistors that needed manual changing on our previous controls. The digital signal processing enabled by the circuitry of FIGS. 2 or 3 allows automatic setting of controls through the use of equations or algorithms. The circuitry controlled in setting up a scale is the offset, the gain, weigh timers, and the digital filter. The setting of these values adapts the system to any scale, weight range, and package speed.

Figure 12:
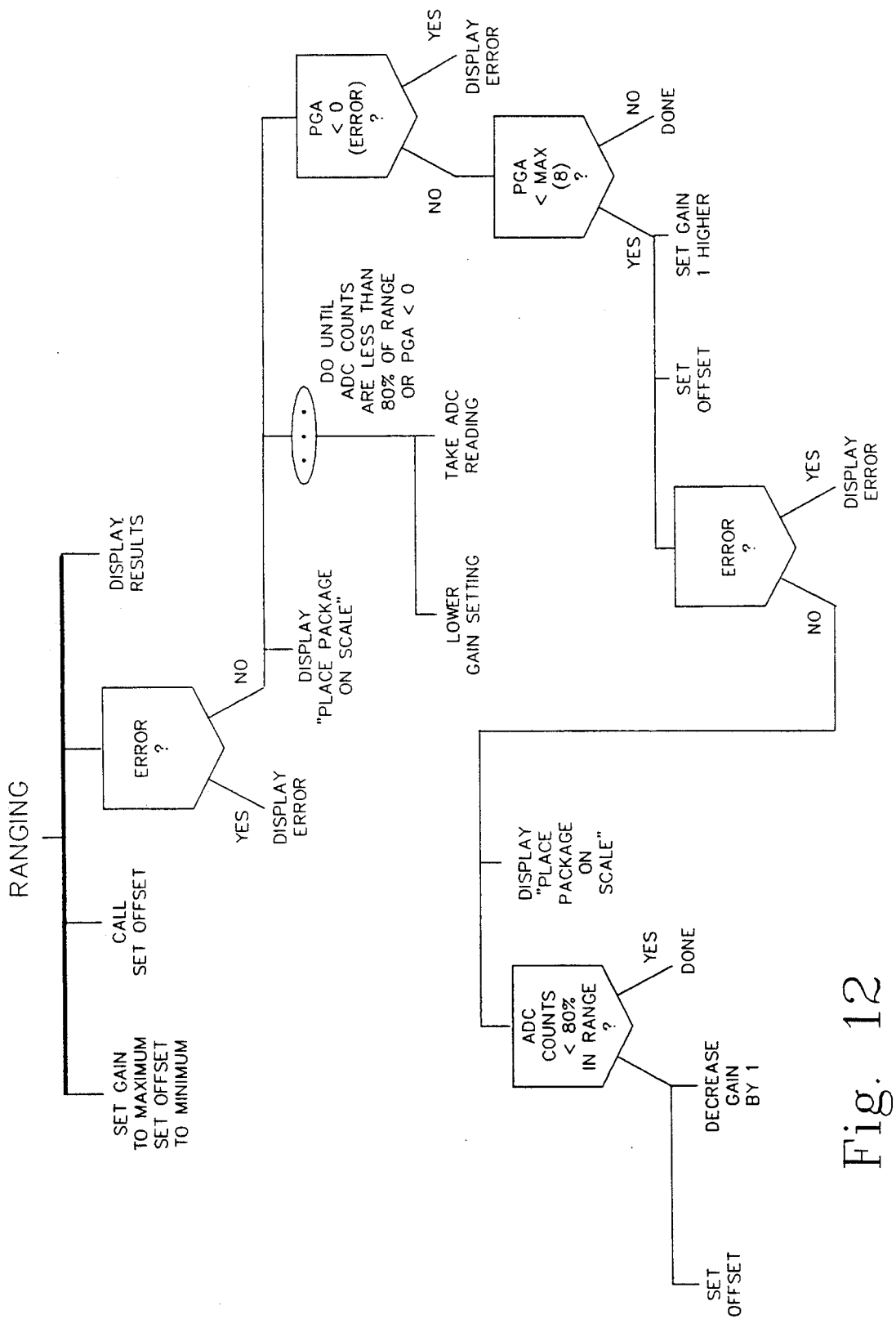
FIG. 12 is a functional flow diagram depicting the algorithm processes involved in setting the range routine.
Figure 13:
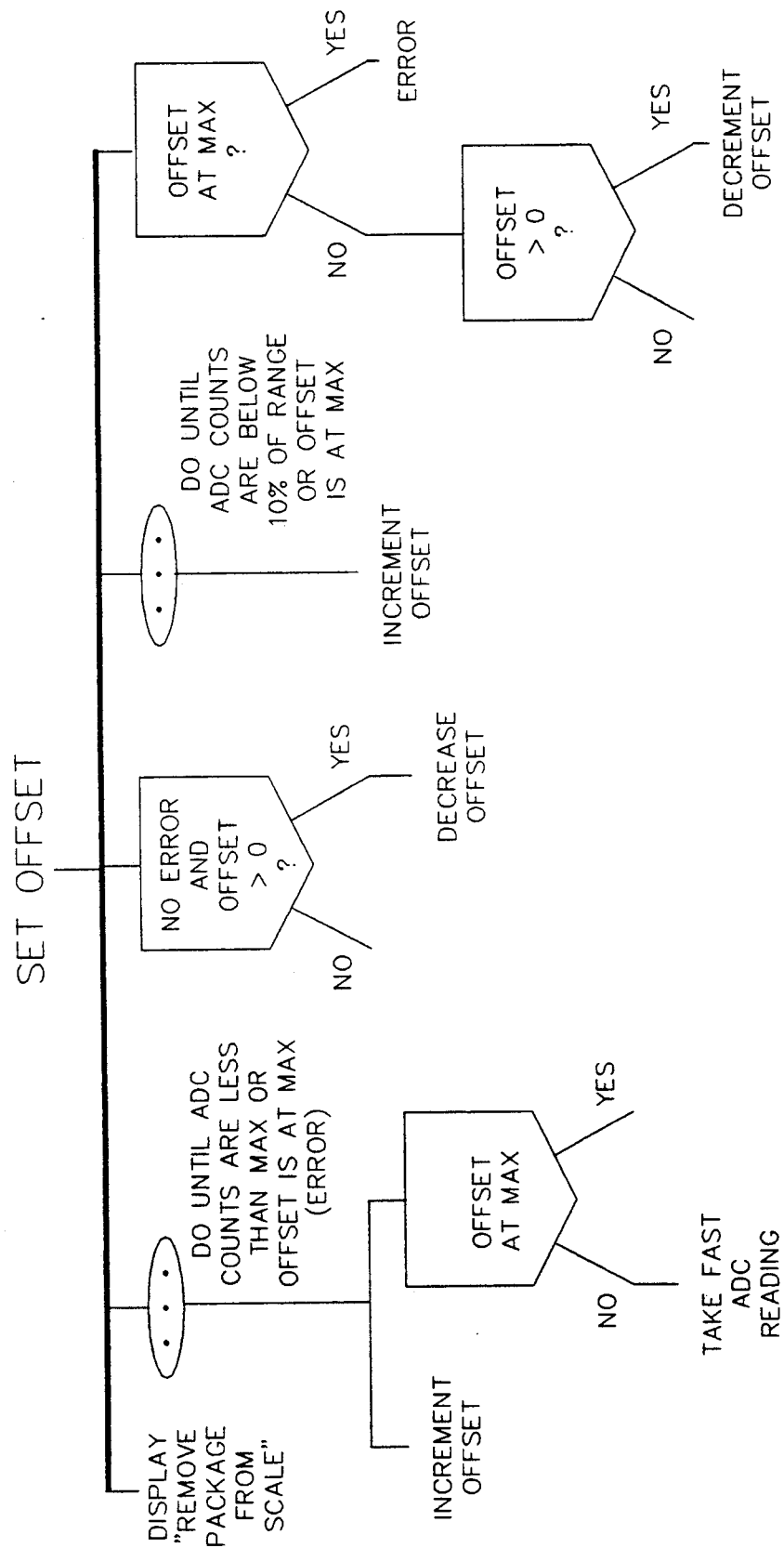
FIG. 13 is a functional flow diagram depicting the algorithm processes involved in setting the offsets.

The Range Routine is used to set the gain and offset to the optimal values for a given load cell, dead load, and weight range. The circuits adjusted are the 8-bit (values from 0-255) digital-to-analog converter, 207 of FIG. 2, and the programmable gain amplifier, 204. The procedure for setting the gain and offset involves adjusting the digital-to-analog converter (DAC) and programmable gain amplifier (PGA) and instructing the operator to place a package on and off the scale until optimum values for the DAC and PGA are found according to the logical operations of ranging and set offset algorithms as illustrated in FIGS. 12 and 13.

Figure 14:
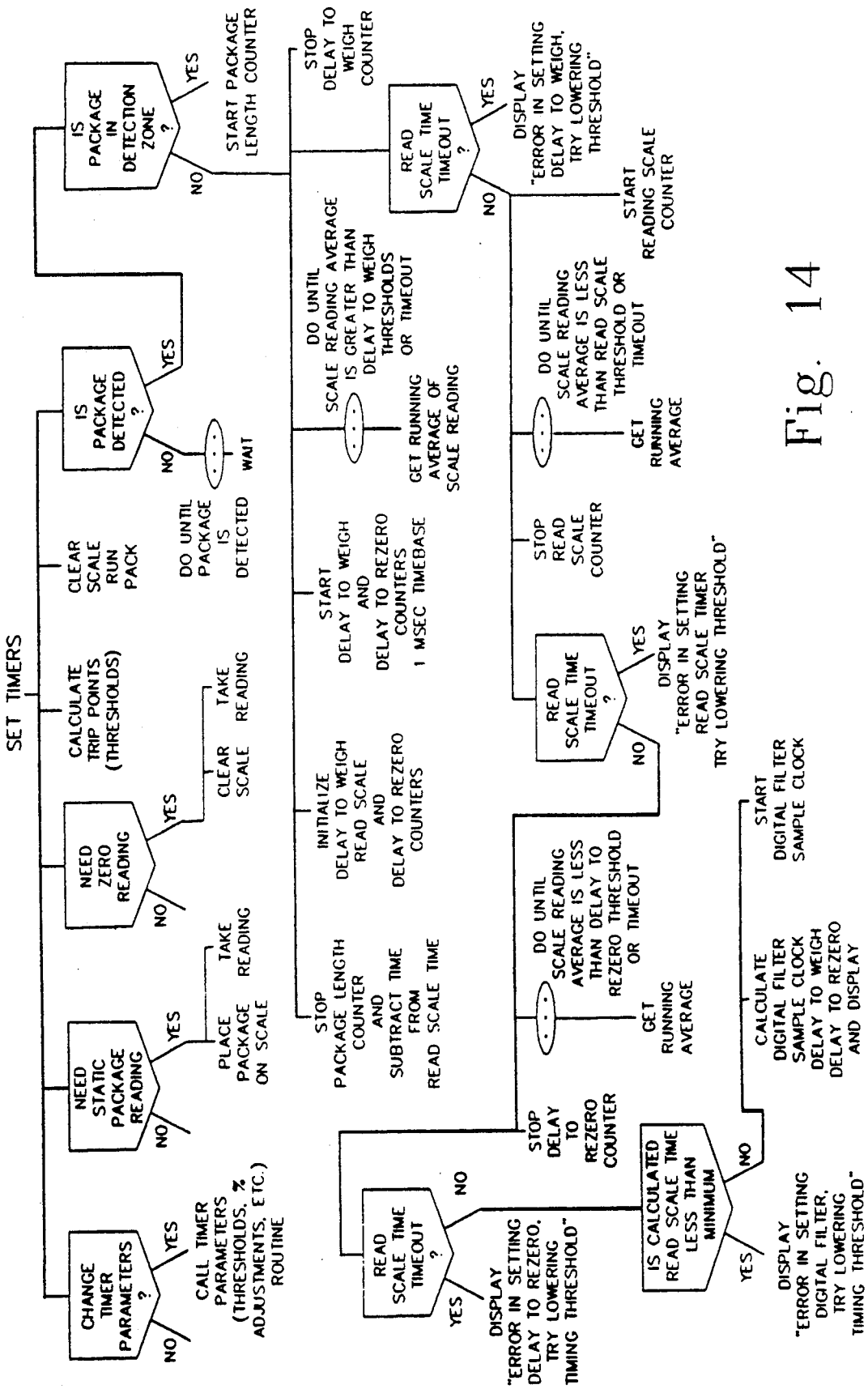
FIG. 14 is a functional flow diagram of the integrated weighing/timing process depicting the algorithm which adapts the timers to the package length.

The system automatically calculates values for the delay-to-weigh, read scale, delay to rezero and digital filter cutoff for each package individually during production by exercising the logic of FIG. 14. ("During production" means while the system is being used in a packaging plant which is producing packages for weighment and sending them across the checkweigher.) This is accomplished by using two measurements and two adjustment factors. These four pieces of information are set to default values, but can be changed by the operator in order to optimize the timing calculations. The two measurements are the speed of the conveyor belt over the scale in feet per minute and the length of the weigh pan in inches. The two adjustments are a "delay to weigh" adjustment and a "read scale time" adjustment, both entered in milliseconds. The checkweigher uses the two measurements to arrive at a "raw read scale time" according to the following formula:

$$\text{raw read scale time} = \frac{(\text{weigh pan length in inches} \times 5)}{\text{belt speed in feet per minute}}$$

The raw read scale time is the time it takes the leading edge of a package to traverse the full length of the weigh pan. This value is stored in the checkweigher memory.

The delay to weigh, delay to rezero, specific read scale time, and digital filter cutoff value for each individual package is calculated during production as each package traverses the weigh pan by exercising the logic of FIG. 14, described as follows. This is the weighing process, as well. In the adaptive timing system, the calculation of timers is an inherent part of the weighing process:

1) The leading edge of package reaches the upstream end of the weigh pan, triggering the package detector device which is used to measure the length of the package.
2) The calculation of the specific read scale time for this package is begun by initially setting it equal to the raw read scale time (the calculation of which is explained above). It is stored in the checkweigher memory where it remains during the adjustments it undergoes according to the following steps 3 and 5.
3) Every N milliseconds, (where N is typically, though not exclusively, defined to equal either 10 or 2), the package detector is interrogated.
   IF the package has not yet fully loaded on to the weigh pan, the detector will so indicate and the software will deduct N milliseconds from the specific read scale time for this package. It will wait N milliseconds and repeat step 3.
   IF the package has fully loaded on to the weigh pan, the detector will so indicate and the software will deduct N milliseconds from the specific read scale time and go on to step 4.
4) The delay to weigh timer will be set equal to the delay to weigh adjustment and it will be started.
5) The specific read scale time for this package will be reduced by an amount equal to the delay to weigh adjustment and then reduced again by an amount equal to the read scale time adjustment. [the distinction between raw read scale time and specific read scale time is this: the raw read scale time is the amount of time it takes a package to traverse the entire weight pan and the specific read scale time is that portion of the raw read scale time during which the entire package is on the weigh pan and sufficiently stable to perform the weighing process. Any reference to "raw read scale time" in this document refers exclusively to the "raw read scale time". Any reference to "specific read scale time" or "read scale time" are both to be construed as referring only to the "specific read scale time."] The weighing clock will be started using the specific read scale time for this package. The digital filter cutoff value is calculated from the specific read scale time. The digital filter uses a sample rate clock that takes an ADC reading on every clock tick. A total of 40 samples are taken during the specific read scale time. The sample rate is given by: 40 samples divided by the read scale time. The longer the read scale time, the lower the sample rate frequency. The lower the sample rate frequency, the lower the filter cutoff. The two unique features of the digital filter are: it only filters the "top" of the weight curve, and the weight samples are "run through" the filter twice, which produces a more effective filtering action. The unique feature of the adaptive timing system is that the read scale time is maximized for each package, keeping the filter cutoff as low as possible; thereby maximizing noise reduction—and therefore weighing accuracy—for each package individually.
6) At the time the specific read scale time is calculated, the delay to rezero is also calculated and set equal to the sum of the raw read scale time plus the delay to weigh adjustment. The delay to rezero timer is started.

*delay to rezero = raw read scale time + delay to weigh adjustment*

7) The delay to weigh timer begun in step 4 times out and the package is weighted using the read scale time and filter cutoff calculated in step 5.
8) The delay to rezero timer begun in step 6 times out and the system attempts a rezero operation.

Figure 15A:
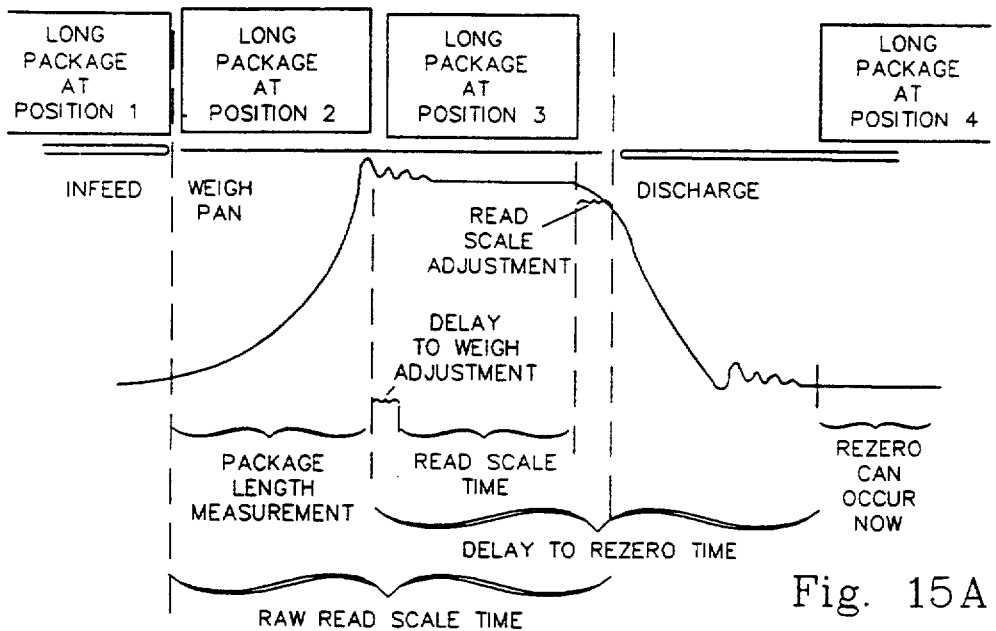
FIG. 15a depicts the timing which results using a long package as it relates to a weight curve typical for a long package.
Figure 15B:
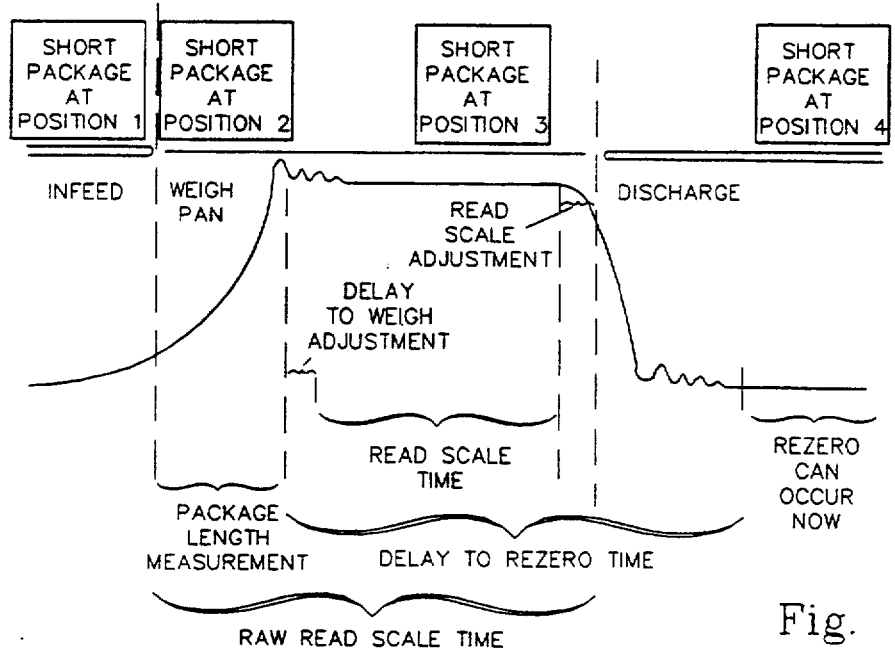
FIG. 15b depicts the timing which results using a short package as it relates to a weight curve typical for a short package.

FIGS. 15a and 15b illustrate the process described above. FIG. 15a illustrates the timing which results with a long package. FIG. 15b illustrates the timing which results with a short package. Each package is depicted in four successive points in time as it moves onto, across, and off of the weigh pan (the weigh pan is the scale). The detector for measuring package length is located at the infeed end of the weigh pan. The timing which results from the analysis of the package length is shown in the bracketed timing spans o the diagram. The key difference is in the specific read scale time, which is designated as C in these diagrams. it is wider for the short package than for the long package and, in both cases it is as wide as it can be. These diagrams superimpose the "weight curve" on the timing spans in order to illustrate the relationship between the stable portion of the weight curve and the timers. The "weight curve" is like a graph depicting weight and time. Time is the horizontal axis. Weight is the vertical axis. The weight rises as the package makes its way on to the weigh pan, bounces a little as the package settles down, flattens during its passage across the weigh pan and then falls off as the package exits the weigh pan. A little more bouncing after the falloff is followed by a stable, scale empty period indicating a propitious time for a rezero operation.

It is the ability to change the read scale time from package to package which is the real value of the invention, enabled by the inclusion of a package detector capable of measuring the length of a package. Shorter packages will have longer read scale times, therefore a lower digital filter cutoff, therefore better noise elimination, therefore more accurate weighing. Every package will have as long as read scale time as possible, therefore every package will be weighed as accurately as possible for the given belt speed. Under the prior art, no means of measuring differences in package length was employed and the read scale time for ALL packages was fixed to the same value, specifically a value appropriate for the longest package, i.e. a short read scale time. The potential use of a longer read scale time with shorter packages was unexploited. With adaptive timing, the checkweigher takes maximum advantage of the time each individual package is on the scale.

Figure 16:
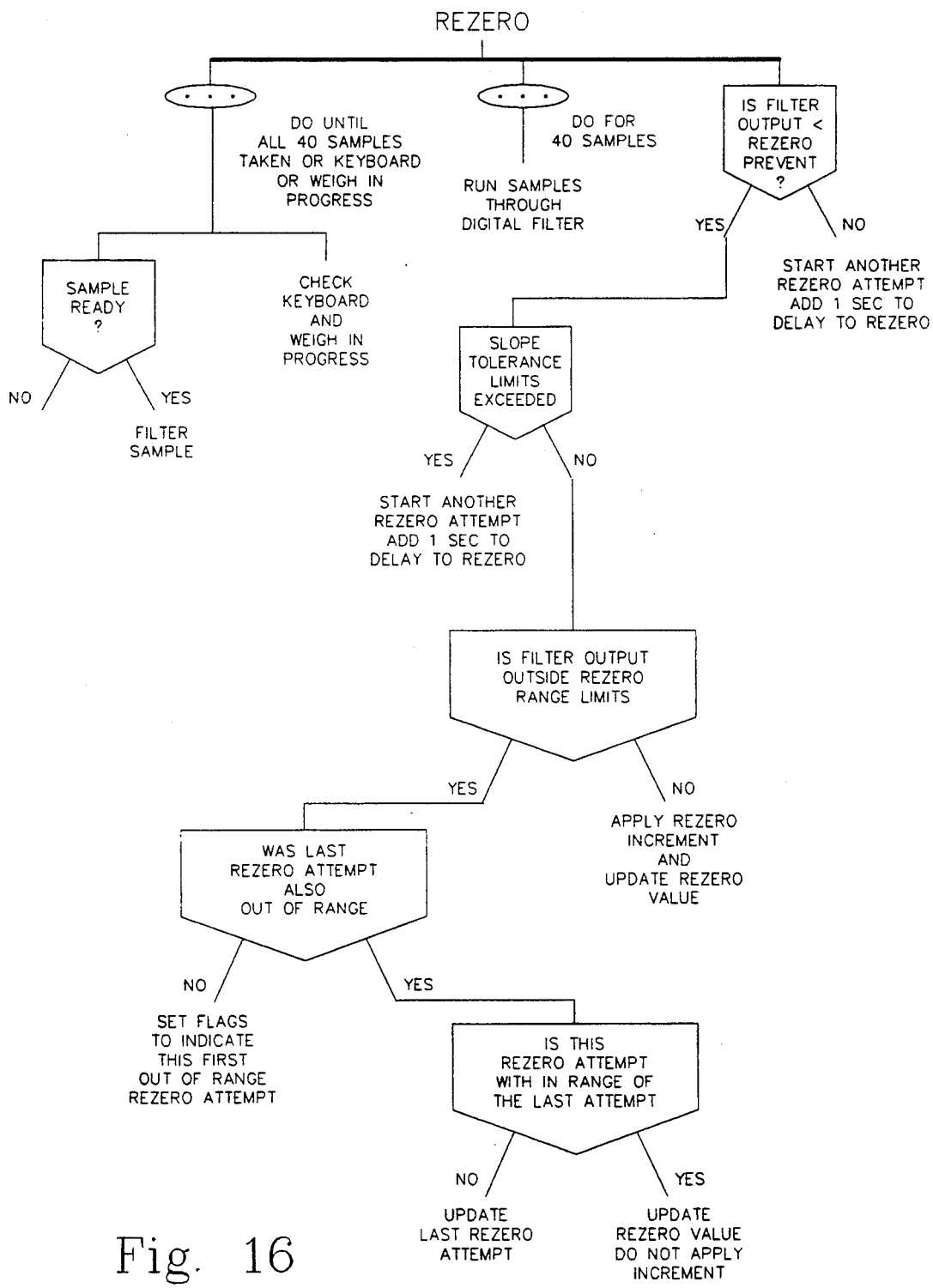
FIG. 16 is a functional flow diagram depicting the algorithm processes involved in setting the rezero algorithm.
Figure 17:
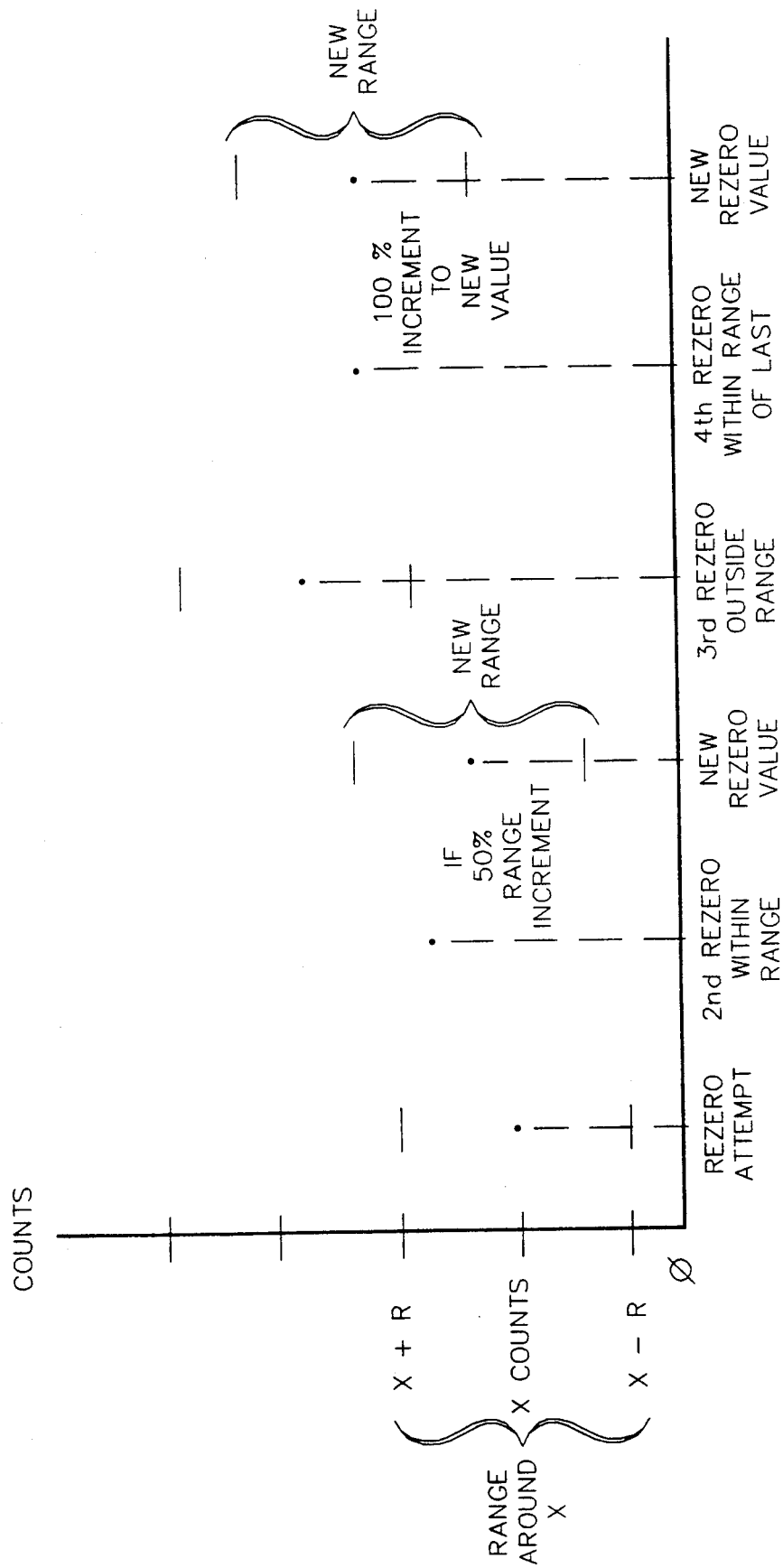
FIG. 17 is a graphical presentation of the range and increment plot of the rezero algorithm.
Figure 18:
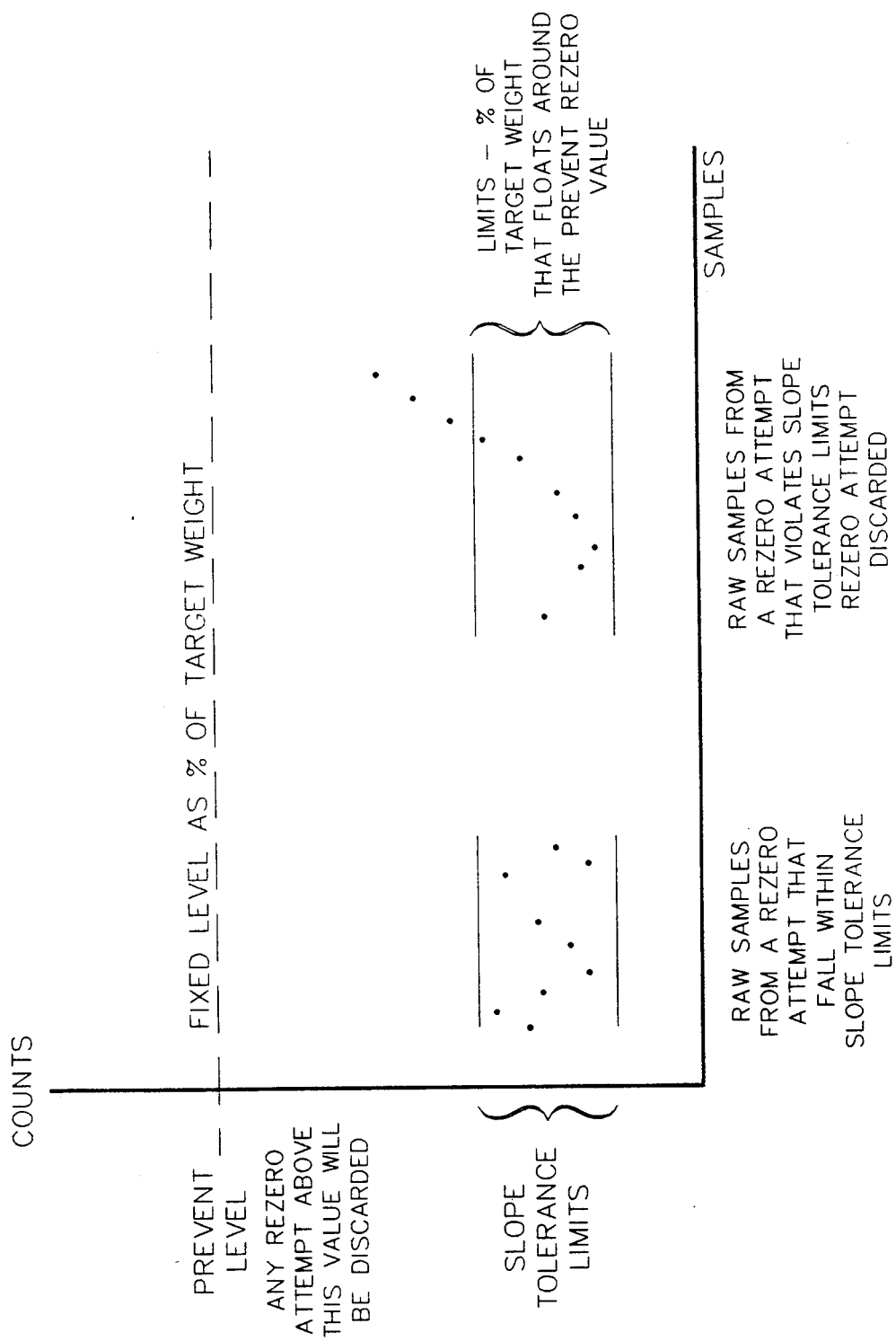
FIG. 18 is a graphical presentation of the prevent and slope tolerance of the rezero algorithm.
Figure 14:
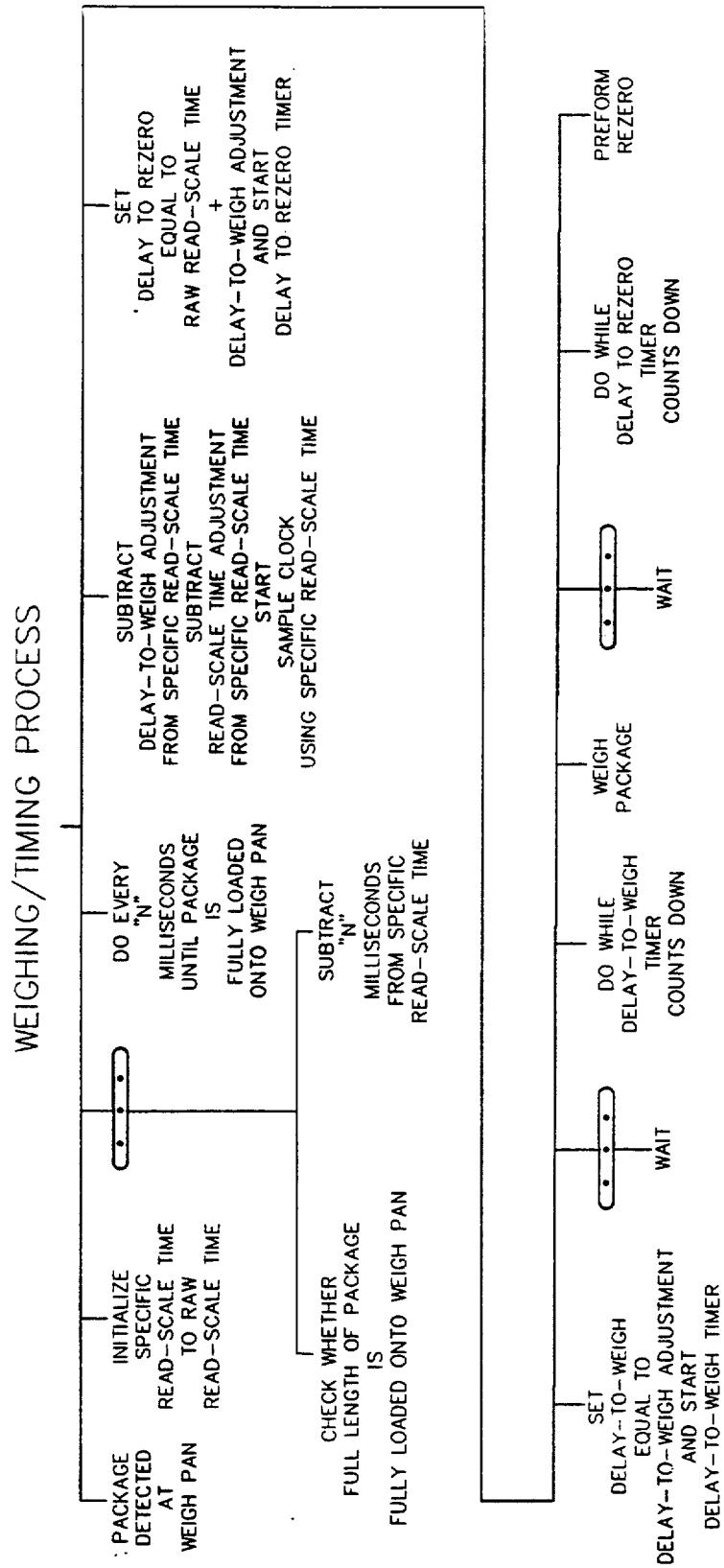

The system determines a weight by measuring the difference between a package passing over the scale and the "rezero value" or weight of an empty scale. The system continuously reads the scale or does rezero attempts whether or not product is being run. Rezeros are needed to counteract the effects of drift, product buildup, and other temperature, electronic, and mechanical effects. The system employs a complicated rezero algorithm that is implemented by the logic of FIG. 16. It is user adjustable. FIGS. 17 and 18 show the rezero algorithm graphically.

A rezero attempt is evaluated and compared to the rezero range as one of the criteria for updating the rezero value. The rezero range is given as a percent of scale range. This percent of scale range is ultimately converted into counts around the current rezero value, which is also in counts, see FIG. 17. If a new rezero value passes the other criteria for a successful rezero attempt (rezero prevent and slope tolerance) then the new rezero value is compared to the current rezero values, range. If the new attempt is within the current range then the new rezero value is calculated as a proportional incremental value between the current rezero value and the new rezero attempt.

For example, if the current rezero value is equal to 500 counts and the range is 100 counts, the current rezero range extends from 600 counts to 400 counts. If the new rezero attempt is equal to 550 counts and the increment is equal to 50% (user enter) then the new rezero value will be: 500 counts $+((550-500) \times 50\%)$ or 525 counts. If the new attempt value is greater than the current range, say 650 counts, then the rezero value is not updated but the new attempt value is "remembered" (the value of 650 counts is stored in memory).

If on the next rezero attempt the value is outside the current rezero range (400 to 600 counts in our example) but within range of the last attempt, then the rezero value is updated to the new value without an incremental percent.

In the foregoing example, if the new attempt is equal to 700 counts, (outside the current range of 400 to 600 counts, the last attempt was 650 counts). The range is adjusted around the last attempt. The range is set to 650±100 counts or 550 counts to 750 counts. Since the new attempt lies within this range and the new attempt also passes the other criteria for a successful rezero (rezero prevent and store tolerance) and it is the next consecutive attempt, then the rezero value is updated to this new value or 700 counts.

This unique feature of the rezero algorithm compensates for product spillage or other effects that can produce a large jump in the rezero value. The incremental percent helps filter small jumps in the rezero value (those within the rezero range) and still provides for rezero changes due to drift or small amounts of product buildup. The slope tolerance feature rejects rezero attempts that have too large a noise content or reflect a package coming or leaving the scale. The rezero prevent allows weighing the package statically (package on scale without running) without the package being rezeroed out. All the rezero parameters, i.e. prevent slope tolerance, range, and increment can be user altered to achieve the best possible accuracy. These parameters are also stored on a product by product basis with up to 25 sets of parameters available in a single system. A larger memory can be used to store an ever greater number of product parameters.

A rezero attempt occurs after the delay-to-rezero timer times out. Samples are taken and filtered similar to weighing. A rezer attempt is discarded if the following occur:

1) The range of unfiltered samples exceed, in value, a range called slope tolerance.
2) The rezero attempt exceeds a maximum ceiling called the rezero prevent.
3) A weigh cycle has been initiated.

If the rezero attempt passes the above (3) criteria, its value is checked to see if it is in range with respect to the previous rezero attempt. If the attempt is within the rezero range, then a new rezero value is calculated by applying an incremental percent. The equation is given by:

New Rezero Value = Previous rezero plus or minus the difference between the two values times the incremental percent.

The rezero parameters—range, slope tolerance, prevent, increment—are all entered as percents of product range.

If the rezero attempt is out of range of the rezero value, its value is remembered until the next rezero attempt. If that attempt is also out of range of the rezero value (two consecutive out of range attempts) and the two attempts are also within range of themselves, then the rezero value is updated to the last attempt. This feature allows both an incremental rezero, which helps in a noisy scale environment, and a rezero procedure that handles scale levels that jump to different levels because of product spillage.

The system weighs a package according to the weighing/timing process described above and illustrated in FIG. 14.

The weigh routine also checks if there was excessive noise during scale interrogation. This is done by comparing the highest and lowest prefiltered scale readings with a preset range called the scale noise range. If the sample range is greater than the scale noise range, then an alarm is activated (scale noise indicator). Scale noise range is input the same as rezero slop tolerance; as a percent of product range.

Weight calibration is part of the automatic setup procedure. It is the last step in the process and can be entered separately, if desired. The calibrate procedure is multiple pass with provision for cancelling the last pass if there was a problem with it. To assist the operator, the "scale counts" are displayed on the weight display. The calibrate procedure also does an "initial rezero". The initial rezero measures the empty scale using a special routine that provides the utmost filtering possible. A special low frequency cutoff digital filter is used for the initial rezero. This provides a very accurate rezero result. A standard rezero, using the automatically determined digital filter, is used between passes of the multiple pass calibrate. The average of all the calibrate passes is used to determine the weight calibration factor.

The preceding routines illustrated by FIGS. 12 through 16 are executed by the microprocessor as an interacting group of algorithms which preform the following steps.

The ranging function is the process of setting both the gain and the offset. Gain and offset affect each other. By changing the gain the offset is effected. The gain is adjusted when there is a package on the scale and the offset is adjusted when the scale is empty. The procedure for setting the range consists of the interaction of Steps 1 and 2 which follow.

Step 1—execute a ranging routine to establish the gain for the programmable gain amplifier with a sample item on the load sensing stage by:
(a) setting the gain of the programmable gain amplifier to maximum.
(b) setting the programmable gain amplifier offset to minimum.
(c) execute Step 2 (a) through (h)
(d) placing a package on the scale platform.
(e) lowering the gain of the programmable gain amplifier in incremental steps.
(f) reading the count of the analog-to-digital converter after each of said incremental steps.
(g) stopping lowering the gain when the count of the analog-to-digital converter equals less than 80% of a predetermined percentage of the range or the gain of the programmable gain amplifier is less than zero.
(h) determine if the gain of the programmable gain amplifier is less than maximum, if it is, increment the gain by one increment, if it is not, proceed with Step 3.
(i) execute the Step 2 sequence, set offset routine, Steps (a) through (h) to reject the gain setting.
(j) determine if the count of the analog-to-digital converter is less than 80% or a predetermined percentage of the range, if it is, proceed to Step 3 and if it is not, decrement the gain by one increment and execute the Step 2 sequence, set offset routine, Steps 2 (a) through (h).

Step 2—executing a set offset routine for establishing a programmable gain amplifier offset when the load sensing stage is empty by:
(a) clear the scale platform
(b) raising the offset for the programmable gain amplifier in incremental steps.
(c) reading the count of the analog-to-digital converter after each incremental step.
(d) stop raising the offset when the count of the analog-to-digital converter equals less than 10% or a predetermined percentage of the range or said offset is at maximum.
(e) determine if the offset is less than maximum.
(f) if the offset is less than maximum, determine if the offset is greater than zero.
(g) if the offset is greater than zero, decrement the offset by one increment.
(h) return to Step 1.

The purpose of the cycling between Steps 1 and 2 in the RANGE routine (resetting the gain and offset) is to provide the optimal values for gain and offset. These values of gain and offset are stored on a product by product basis. This allows the system to store up to 25 different ranges for up to different products.

Step 3—The system weighs a package according to the weighing/timing process described above and illustrated in FIG. 14.

Step 4—execute a rezero routine for resetting the system for the next weighing operation by:
(a) running the digital filter routine on 40 or a predetermined number of samples.
(b) determine if the filter output is less than the maximum rezero value.
(c) determining if the slope tolerance of the unfiltered samples is within limits.
(d) determining if the filter output is outside of the rezero range limits if the slope is within limits,
(e) if the filter output is inside of the rezero range limits, update the rezero value by an incremental percent.
(f) if the filter output is outside of the limits, determine if there has been two consecutive out-of-range rezero attempts where the attempts were within range of each other, if true, update the rezero value.

The preceding steps automatically set up the system's electronic functions through the use of algorithms which automatically optimize weight sampling by automatically establishing the duration of the sample window as a function of product line speed. Spurious readings are eliminated by the algorithms which control sampling times, the time between samples, and sampling rates and impose digital limits on data taken.

In addition, the preceding steps result in the execution of the following steps by manipulation of data through algorithm execution by the program:

Available counts per unit weight are optimized by weight range and package characteristics and speeds, therefore allowing better accuracy than achievable in the past where trade-offs were made to achieve setup of the machine by maximum weight, maximum speed, optimization during the setup procedure and, therefore, throwing away—for example—counts per gram or filter capability at slower speeds.

The sampling rate for reading weights is increased or decreased to fit the available weight information window, therefore allowing lower filter values if higher time exists and achieving better accuracy.

Product effect and electrical or mechanical drift effect are compensated for by unique incremental and proportional rezero algorithms.

Required sampling times are reduced by reiterations of samples to increase overall number of samples without excessive sampling window, therefore allowing higher rates of speed than normally possible.

Unique sampling rates and filter settings are established for rezero and weighing algorithms.

The effect of low frequency background noise is eliminated by using different filter values for the rezero as compared to the weighing function.

The memory effect encountered when weighing at high rates of speed due to charging and discharging of analog filters is eliminated.

The individual electronic component parts used to assemble this invention have not been specifically identified in the Description Of The Invention to avoid confusion generated by the rapidly advancing electronic technology and because it is the inventors intention that this invention should follow technological advancements. It should be reduced to practice using the latest hardware which can be assembled by one reasonably skilled in the art in accordance with the specification and drawings presented here with. The following is a list of the main components used by the inventor to create his most recent version of the invention. Their function and application is defined by manufacturers' specifications which are incorporated here in by reference.

| Microprocessor | Intel | N80C188-10 |
|---|---|---|
| Programmable Gain Amplifier | | |
| Analog Switch Array | Harris | HI-507-5 |

| | -continued | |
|---|---|---|
| Instrumentation Amp | Analog Devices | AD625C |
| | Low Pass Filters | |
| First Stage | Linear Technology | LT1007 |
| Second Stage | Harris | HA3-2605-5 |
| Analog-To-Digital Converter | Crystal Semiconductor | CS5014-KP28 |
| Digital-To-Analog Converter | PMI | PM7524HP |
| Pre-Amp (Op-Amps) | Linear Technology | LT1028ACN8 |

The adaptive timing strategy employed in the invention requires the operator to enter the conveyor belt speed in feet per minute and the weigh pan length in inches. The invention uses these entries to calculate a raw read scale time. It also requires that a photoelectric eye or other package detector be placed at the upstream end of the weigh pan. Alternately, the strategy may be employed by (a) position a detector at both ends of the weigh pan and measuring the raw read scale time by measuring the time it takes a package to traverse the distance between the sensors. This eliminates the need for the operator to enter any numbers. Or (b) requiring the operator to enter the raw read scale time along with the delay to weigh adjustment and read scale time adjustment already being entered. To do this the operator, rather than the checkweigher, would calculate the raw read scale time.

Adjusting the specific read scale time to the length of the package allows checkweighers confronted with packages of random length to weigh each individual package more accurately. The read scale time is not dictated by the longest package and imposed upon shorter packages. The shorter packages can now be weighed to better accuracy because they will be weighed for a longer period of time.

The adaptive timing algorithm of the invention is also useful in applications where packages are of fixed length but tend to skew as they move on to the weigh pan. Different amounts of skew present different package profiles to the detector, effectively creating different length packages. Presently it is common for badly skewed packages to be misweighed because they partially exit the weigh pan during the read scale time. The only way to prevent this skewing inaccuracy under current technology is to shorten the read scale time, which compromises the accuracy of the non-skewed majority of the packages. The adaptive timing algorithm of this invention will adjust the read scale time automatically and dynamically to compensate for skewing and thereby obtain a better weighment for every package, skewed or not.

It will now be understood in view of the applicants, teaching herein, that variation in operational steps, algorithm, algorithm execution, material, dimensions and geometry are contemplated as being within the scope of the present invention, which is limited only by the appended claims.

What I claim is:

1. An in-motion weighing system, comprising:
   means for conveying a package; a weight pan;
   a package detector positioned along said conveying means and upstream from said weight pan;
   means responsive to said package detector for determining a time required for said package to pass by said package detector;
   means for dividing a length of said weight pan by a speed of said conveying means for establishing a raw read scale time;
   means for subtracting said time for said package to pass said package detector from said raw read scale time for establishing a read scale window; and
   means for measuring the weight of said package on said weight pan during said read scale window.

2. An in-motion weighing system as defined in claim 1, comprising:
   a control box including switch means for setting and controlling operational parameters of said automatic weighing system;
   a transducer for producing an electrical signal which varies in response to a load;
   a programmable gain amplifier for amplifying said electrical signal;
   a microprocessor including means for digitally filtering the output of said programmable gain amplifier;
   said microprocessor including means for inputting data to said microprocessor electrically connected to the output of said programmable gain amplifier;
   said microprocessor including an output means for providing a signal for setting the gain of said programmable gain amplifier at a level which is a function of said electrical signal received at said data input means; and
   said microprocessor including means for providing control signals for setting operating levels of said programmable gain amplifier.

3. An in-motion weighing system as defined in claim 1, wherein said programmable gain amplifier includes an instrumentation amplifier, comprising:
   a plurality of resistive elements; and
   a plurality of analog switches responsive to said microprocessor for connecting selected resistive elements from said plurality of resistive elements to the gain control circuitry of said instrumentation amplifier for controlling the gain of said programmable gain amplifier.

4. An in-motion weighing system as defined in claim 1, comprising:
   a filter electrically connected in series with said digital filter and said programmable gain amplifier; and
   said programmable gain amplifier electrically interposed between said digital filter and said filter.

5. An in-motion weighing system as defined in claim 1, comprising:
   means for setting a scale offset level for said programmable gain amplifier.

6. An in-motion weighing system as defined in claim 1, comprising:
   a second filter electrically interposed between said programmable gain amplifier and said microprocessor data input means.

7. An in-motion weighing system as defined in claim 1, comprising:
   a filter electrically interposed between said programmable gain amplifier and said microprocessor data input means;
   an analog-to-digital converter electrically interposed between said filter and said microprocessor data input;
   a second filter electrically interposed between said transducer and said programmable gain amplifier;
   a digital-to-analog converter electrically interposed between said microprocessor means for providing offset control signals and said programmable gain amplifier;

means for setting a scale offset level for said programmable gain amplifier; and a preamplifier electrically interposed between said transducer and said second filter.

8. An in-motion weighing system as defined in claim 7 wherein said programmable gain amplifier includes an instrumentation amplifier and said microprocessor includes output means for automatically setting a dead load offset adjustment for said instrumentation amplifier.

9. A method for automatically executing an in-motion weighing operation, including the steps of:

measuring a weight pan transit time by dividing a weight pan length by a system conveying speed;

measuring a time required for a package to transit a point adjacent to said system conveying means; subtracting said package transit time from said weight pan transit time to produce a read scale time; and determining an average weight of said package while said package is on said weight pan during said read scale time.

10. The method of claim 9 including the steps of:

determining the time required for a load sensing transducer responsive to the load of said weight pan and contents of said weight pan to stabilize after said package is completely on said weight pan; and initiating said read scale time after said stabilizing time.

11. The method of claim 10, including the steps of:

executing a ranging routine for establishing a gain of a programmable gain amplifier with a sample item on the weighing pan;

executing a set offset routine for establishing a programmable gain amplifier offset when the weighing pan is empty;

executing a weighing routine which automatically determines the delay to weigh time, read scale time, delay to rezero time and digital filter cutoff for each package as said package enters the weigh pan;

performing a digital filter routine during said read scale time period; and executing a rezero routine for resetting the system for the next weighing operation.

12. A method for automatically executing an in-motion weighing operation as defined in claim 11 wherein the step of executing said ranging routine includes the steps of:

setting the gain of said programmable gain amplifier to maximum;

setting said programmable gain amplifier offset to minimum;

lowering the gain of said programmable gain amplifier in incremental steps;

reading the count of an analog-to-digital converter after each of said incremental steps;

stopping said lowering of said gain when the count of said analog-to-digital converter equals less than a predetermined percentage of the range or the gain of the programmable gain amplifier is less than zero;

determining if the gain of said programmable gain amplifier is less than maximum and if said gain is, incrementing the gain by one increment; and determining if the count of said analog-to-digital converter is less than said predetermined percentage the range and if said count is not, decrementing the gain by one increment.

13. A method for automatically executing an in-motion Weighing operation as defined in claim 12 including the step of setting the offset level of said programmable gain amplifier after setting the gain o said programmable gain amplifier to maximum or after incrementing the gain of said programmable gain amplifier by one increment or after decrementing the gain of said programmable gain amplifier by one increment.

14. A method for automatically executing an in-motion weighing operation as defined in claim 11 wherein the step of executing said set offset routine includes the steps of:

raising said offset for said programmable gain amplifier in incremental steps;

reading the count of an analog-to-digital converter after each of said incremental steps;

stopping said raising of said offset when the count of said analog-to-digital converter equals less than a predetermined percentage of the range or said off-set is at maximum; and determining if said offset is less than maximum and if said offset is, determine if said offset is greater than zero, if said offset is, decrement the offset by one increment.

15. A method for automatically executing an in-motion weighing operation as defined in claim 11 wherein the calculation of the delay to weigh, read scale time, and delay to rezero timers and of the digital cutoff value is automatically performed by the weighing system and optimized to the length and physical orientation of each package.

16. A method for automatically executing an in-motion weighing operation as defined in claim 11 wherein the step of executing said rezero routine includes the steps of:

running said filter routine on a predetermined number of samples;

determining if the filter output is less than the maximum rezero value;

determining if the slope tolerance of the unfiltered samples is within limits;

determining if the filter output is outside of the rezero range limits if the slope is within limits;

updating the rezero value by an incremental percent if the filter output is inside of the rezero range limits;

determining if there has been two consecutive out-of-range rezero attempts where the attempts were within range of each other if the filter output is outside of the limits, if true, updating the rezero value.

17. A method for automatically executing an in-motion weighing operation as defined in claim 11, including the steps of:

executing a ranging routine for establishing the gain of a programmable gain amplifier with a sample item on the load sensing stage by executing the steps of setting the gain of said programmable gain amplifier to maximum, setting said programmable gain amplifier offset to minimum;

executing a set offset routine for establishing a programmable gain amplifier offset when the load sensing stage is empty by executing the steps of raising said offset for said programmable gain amplifier in incremental steps, reading the count of an analog-to-digital converter after each of said incremental steps, stopping said raising of said offset when the count of said analog-to-digital converter equals less than a predetermined percentage of the range or said offset is at maximum, and determining if said offset is less than maximum and if said offset is less than maximum, determine if said offset is greater than zero, if said offset is greater than zero, decrement the offset by one increment;

lowering the gain of said programmable gain amplifier in incremental steps, reading the count of an analog-to-digital converter after each of said incremental steps, stopping said lowering of said gain when the count of said analog-to-digital converter equals less than a predetermined percentage of the range or the gain of the programmable gain amplifier is less than zero;

continuing said ranging routine by determining if the gain of said programmable gain amplifier is less than maximum and if the gain of said programmable gain amplifier is less than maximum, incrementing the gain by one increment;

executing a set offset routine for establishing a programmable gain amplifier offset when the load sensing stage is empty by executing the steps of raising said offset for said programmable gain amplifier in incremental steps, reading the count of an analog-to-digital converter after each of said incremental steps, stopping said raising of said offset when the count of said analog-to-digital converter equals less than a predetermined percentage of the range or said offset is at maximum, and determining if said offset is less than maximum and if said offset is less than maximum, determine if said offset is greater than zero, if said offset is greater than zero, if said offset is greater than zero, decrement the offset by one increment;

continue said ranging routine by determining if the count of said analog-to-digital converter is less than said predetermined percentage range and if said count of said analog-to-digital converter is not less than said predetermined percentage range, decrementing the gain by one increment;

executing a set offset routine for establishing a programmable gain amplifier offset when the load sensing stage is empty by executing the steps of raising said offset for said programmable gain amplifier in incremental steps, reading the count of an analog-to-digital converter after each of said incremental steps, stopping said raising of said offset when the count of said analog-to-digital converter equals less than a predetermined percentage of the range of said offset is at maximum, and determining if said offset is less than maximum and if said offset is less than maximum, determine if said offset is greater than zero, if said offset is greater than zero, decrement the offset by one increment;

executing an adaptive timing routine to determine the delay to weight time, delay to rezero time, read scale time, and digital filter cutoff of a package as said package enters the weigh pan by executing a calculation of raw read scale time from the given weigh pan length and conveyor belt speed and detecting the length of the package, using the length of the package to calculate the delay to weigh time, specific read scale time, delay to rezero time, and digital filter cutoff;

performing a digital filter routine during said specific read scale time window;

running a digital filter routine during said real scale window period on a predetermined number of samples;

determining if the filter output is less than the maximum rezero value;

determining if the slope tolerance of the unfilter samples is within limits;

determining if the filter output if outside of the rezero range limits if the slope is within limits;

updating the rezero value by an incremental percent if the filter output is inside of the rezero range limits; and determining if there has been two consecutive out-of-range rezero attempts where the attempts were within range of each other if the filter output is outside of the limits, if true, updating the rezero value.

18. An in-motion weighing system which include a means for transporting a package across a weigh pan, comprising:

means for establishing a raw read scale time including means for measuring a transit time of a leading edge of said package therefore "to cross" the length of said weigh pan;

means for determining a time function of a length of said package including means for measuring a time equivalent to the transit time of said package across the leading edge of said weigh pan;

means for establishing a read scale time comprising means for subtracting said package time function from said raw read scale time; and means for weighing said package for a duration of said read scale time while said package is on said weigh pan.

19. An in-motion weighing system as defined in claim 18, comprising;

means for determining the settling time of said weigh pan after said package is completely deposited thereon; and means for delaying the start of said read scale time until the end of said settling time.

20. An in-motion weighing system as defined in claim 18, comprising:

said means for weighing includes a transducer means for outputting an electrical signal representing the combined weight of said weigh pan and the contents of said weigh pan;

said means for measuring the transit time of said package across the leading edge of said weigh pans includes a package detector;

means for determining a delay-to-weigh time including the time required for said package to be completely on said weigh pan and for said transducer output to stabilize; and means for initiating said read scale time at the end of said delay-to-weight time.

* * * * *

UNITED STATES PATENT AND TRADEMARK OFFICE
CERTIFICATE OF CORRECTION

PATENT NO. : 5,300,736
DATED : April 5, 1994
INVENTOR(S) : Steven P. Ehrhardt

It is certified that error appears in the above-indentified patent and that said Letters Patent is hereby corrected as shown below:

The drawing sheets, consisting of Fig. 14, should be deleted to be replaced with the drawing sheet, consisting of Fig. 14, as shown on the attached pages.
Figs. 15A, 15B, should be added as shown on the attached pages.

Signed and Sealed this

Fourth Day of April, 1995

*Attest:*

BRUCE LEHMAN

*Attesting Officer*    Commissioner of Patents and Trademarks